United States Patent
Rese et al.

(10) Patent No.: US 10,904,023 B2
(45) Date of Patent: Jan. 26, 2021

(54) CUSTOMIZED MULTICASTING

(71) Applicant: International Business Machines Corporation, Armonk, NY (US)

(72) Inventors: Joachim Rese, Hockenheim (DE); Thomas H. Gnech, Herrenberg (DE); Regina Illner, Nufringen (DE); Sabine U. Jaeschke, Reilingen (DE); Ilke Tiebs, Ludwigshafen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/436,994

(22) Filed: Jun. 11, 2019

(65) Prior Publication Data

US 2019/0296923 A1  Sep. 26, 2019

Related U.S. Application Data

(63) Continuation of application No. 15/826,791, filed on Nov. 30, 2017.

(51) Int. Cl.
*H04L 12/18* (2006.01)
*G06Q 50/16* (2012.01)

(52) U.S. Cl.
CPC .......... *H04L 12/18* (2013.01); *H04L 12/1886* (2013.01); *G06Q 50/16* (2013.01)

(58) Field of Classification Search
CPC ............................ H04L 12/18; H04L 12/1886
See application file for complete search history.

(56) References Cited

U.S. PATENT DOCUMENTS

| | | | |
|---|---|---|---|
| 5,953,336 A * | 9/1999 | Moore | H04L 12/56 |
| 6,347,330 B1 | 2/2002 | Dawson | |
| 6,556,835 B1 * | 4/2003 | Raivisto | H04Q 7/20 |
| 9,100,799 B1 | 8/2015 | Thiagarajan | |
| 2002/0018469 A1 * | 2/2002 | Davis | H04L 12/28 |
| 2002/0080720 A1 * | 6/2002 | Pegrum | H04L 1/00 |
| 2003/0033426 A1 * | 2/2003 | Beukema | G06F 15/16 |
| 2006/0010232 A1 * | 1/2006 | Page | G06F 15/16 |
| 2006/0018327 A1 * | 1/2006 | Brueckner | H04L 12/36 |

(Continued)

OTHER PUBLICATIONS

Acharya et al., "Balancing Push and Pull for Data Broadcast", SIGMOD '97, AZ, USA, © 1997 ACM, pp. 183-194.

(Continued)

*Primary Examiner* — Ronald B Abelson
(74) *Attorney, Agent, or Firm* — Aaron N. Pontikos

(57) ABSTRACT

A computer-implemented method includes receiving a request to multicast a message, wherein the request includes the message and a restriction bundle. The computer-implemented method further includes generating a distribution list for a first set of devices in a plurality of registered devices based, at least in part, on an overlap between a registered range of a device and a multicast range included in the restriction bundle. The computer-implemented method further includes determining a first subset of devices from the first set of devices based, at least in part, on a set of registered property values associated with each device meeting the criteria of each restriction in the restriction bundle. The computer-implemented method further includes multicasting the message to the first subset of devices. A corresponding computer system and computer program product are also disclosed.

20 Claims, 14 Drawing Sheets

(56) References Cited

U.S. PATENT DOCUMENTS

| | | | |
|---|---|---|---|
| 2008/0126477 A1 | 5/2008 | Kim | |
| 2010/0202339 A1 * | 8/2010 | Chieng | |
| 2011/0252011 A1 * | 11/2011 | Morris | G06F 15/16 |
| 2012/0250503 A1 * | 10/2012 | Willig | H04W 28/10 |
| 2015/0172340 A1 | 6/2015 | Lohmar | |
| 2019/0165960 A1 | 5/2019 | Rese | |

OTHER PUBLICATIONS

Acharya et al., "Dissemination-Based Data Delivery Using Broadcast Disks", IEEE Personal Communications, Dec. 1995, © 1995 IEEE, pp. 50-60.

IBM Appendix P., "List of IBM Patents or Patent Applications to be Treated as Related", Filed herewith, 2 pages.

Wikipedia, "Multicast", From Wikipedia, the free encyclopedia, page last updated Jun. 5, 2015, 13:33, 3 pages, <https://web.archive.org/web/20150608220634/https://en.wikipedia.org/wiki/Multicast>.

* cited by examiner

CUSTOMIZED MULTICASTING

BACKGROUND

The present invention relates generally to the field of network transport protocols, and more particularly to multicast network transport protocols.

The Internet Protocol ("IP") is the principal communications protocol for relaying datagrams across network boundaries. Generally, IP has the task of delivering datagrams from a source host to a destination host based on the IP address in the header section of the datagram. There are three delivery methods supported by IP: unicasting, broadcasting, and multicasting. IP unicasting sends a separate datagram to each recipient host. IP broadcasting sends a single datagram to all hosts on a single network segment (i.e., subnet), even to those not interested in receiving it. Of the three delivery methods supported by IP, multicasting is most practical for one-to-many delivery. The most common transport layer protocol to use multicast addressing is the User Data Protocol ("UDP"). Under UDP, an addressing method is provided for delivery of information to a group of receivers in a single transmission. Each receiver must join the group in order to receive multicast messages sent to the group. Once a source host sends a datagram, nodes in the network (e.g., network switches and routers) replicate the datagram to reach each receiver in the group, such that the datagram is sent over each link of the network only once.

SUMMARY

According to one embodiment of the present invention, a method for customized multicasting is disclosed. The computer-implemented method includes receiving a request to multicast a message, wherein the request includes the message and a restriction bundle. The computer-implemented method further includes generating a distribution list for a first set of devices in a plurality of registered devices based, at least in part, on an overlap between a registered range of a device and a multicast range included in the restriction bundle. The computer-implemented method further includes determining a first subset of devices from the first set of devices based, at least in part, on a set of registered property values associated with each device meeting the criteria of each restriction in the restriction bundle. The computer-implemented method further includes multicasting the message to the first subset of devices.

According to another embodiment of the present invention, a computer program product for customized multicasting is disclosed. The computer program product includes one or more computer readable storage media and program instructions stored on the one or more computer readable storage media. The program instructions include instructions to receive a request to multicast a message, wherein the request includes the message and a restriction bundle. The program instructions further include instructions to generate a distribution list for a first set of devices in a plurality of registered devices based, at least in part, on an overlap between a registered range of a device and a multicast range included in the restriction bundle. The program instructions further include instructions to determine a first subset of devices from the first set of devices based, at least in part, on a set of registered property values associated with each device meeting the criteria of each restriction in the restriction bundle. The program instructions further include instructions to multicast the message to the first subset of devices.

According to another embodiment of the present invention, a computer system for customized multicasting is disclosed. The computer system includes one or more computer system includes one or more computer processors, one or more computer readable storage media, and program instructions stored on the computer readable storage media for execution by at least one of the one or more processors. The program instructions include instructions to receive a request to multicast a message, wherein the request includes the message and a restriction bundle. The program instructions further include instructions to generate a distribution list for a first set of devices in a plurality of registered devices based, at least in part, on an overlap between a registered range of a device and a multicast range included in the restriction bundle. The program instructions further include instructions to determine a first subset of devices from the first set of devices based, at least in part, on a set of registered property values associated with each device meeting the criteria of each restriction in the restriction bundle. The program instructions further include instructions to multicast the message to the first subset of devices.

DETAILED DESCRIPTION

Figure 1:
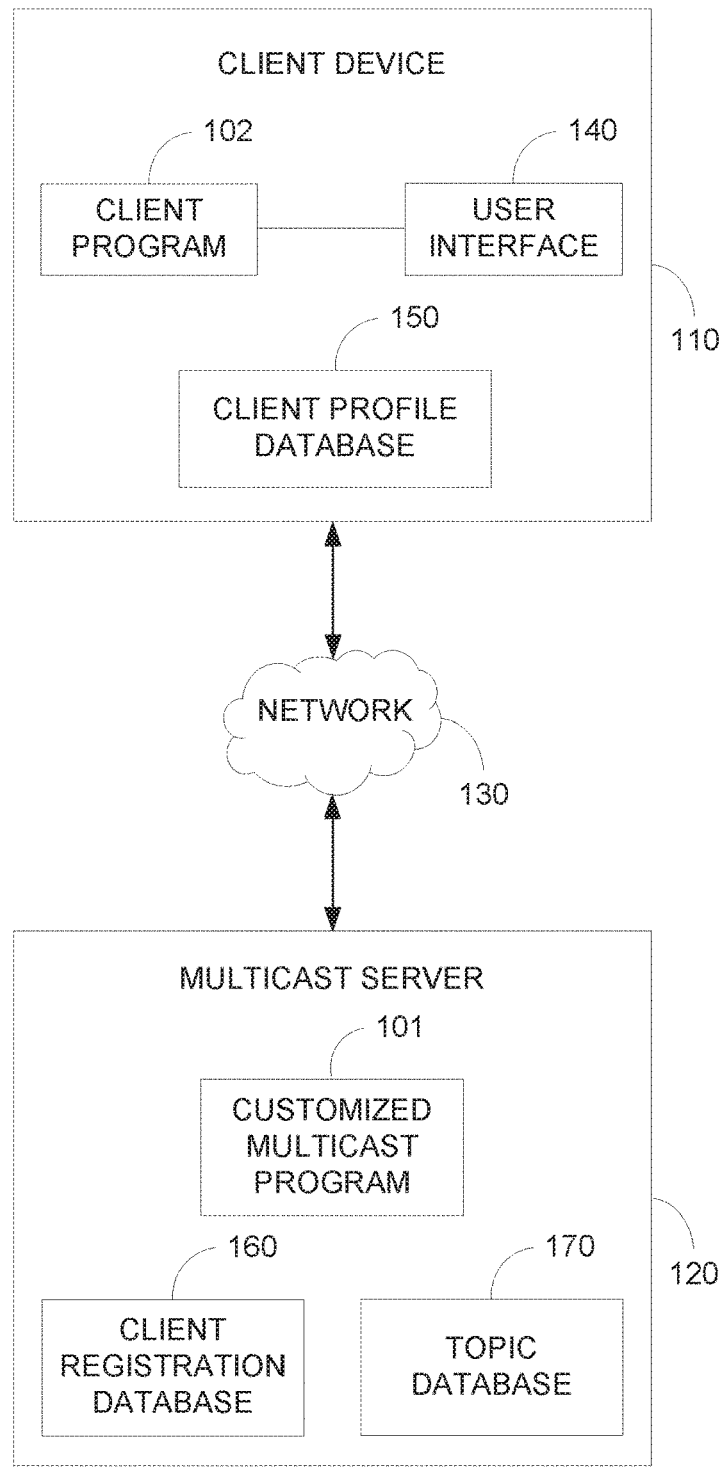
FIG. 1 is a functional block diagram of a network computing environment, generally designated 100, suitable for operation of a customized multicast program and a client program in accordance with at least one embodiment of the invention.

On a multicast-enabled network, a host that is configured to send multicast data can send datagrams to a single designated IP address so that multiple hosts can receive the data. For example, a host can use the Internet Group Management Protocol ("IGMP") on top of the User Datagram Protocol ("UDP") to receive multicast data. IGMP is a communications protocol used by hosts and adjacent routers on multicast networks to join a multicast group. An IP multicast group address is then used by source hosts and receiving hosts to send and receive multicast messages to the router. Source hosts use the group address as the IP destination address in their data packets. Receiver hosts use this group address to inform the network that they would like to join the group, and thus are interested in receiving packets sent to that group. Similarly, receiver hosts can inform the network that they would like to leave the group, and thus are no longer interested in receiving packets sent to that group.

However, embodiments of the present invention recognize that to receive multicast messages, a user is required to join a group. Moreover, embodiments of the present invention recognize that by joining a group, a user becomes a defined member of the group, and thus a follower of any and/or all information sent to the group. Accordingly, a user receives all messages sent to the group, regardless of whether the information is relevant to the user at a given point in time. Embodiments of the present invention further recognize that the information contained in messages sent to a group or received by the group via current multicasting methods is impersonal. This is evinced by the fact that current IP multicast methods do not require a source host to know about any information corresponding to the receiver hosts of the group. Embodiments of the present invention further recognize that current multicasting methods are generally a one-way streaming communication from a source provider to listening receivers.

Embodiments of the present invention provide for dynamically sending customized multicast messages without the need for a device to join a multicast group. In embodiments of the invention, a user can post a message for multicasting that defines a dynamic group of intended receivers, irrespective of whether the device has joined a multicast group. In embodiments of the invention, a dynamic group of intended receivers is determined based, at least in part, on a set of restrictions that accompany a message intended for multicasting.

Embodiments of the present invention provide for dynamically receiving customized multicast messages without the need for a device to join a multicast group. In embodiments of the invention, a user can choose which types of information, as well as under what circumstances the user wants to receive via a multicast message, irrespective of whether the device has joined a multicast group. In embodiments of the invention, whether a device receives a multicast message is based, at least in part, on whether a device meets the criteria of the restrictions that accompany the message at the time the message is to be multicasted. Thus, a user only receives information that is relevant to the user at a given point in time, thereby eliminating unwanted or irrelevant information.

Referring now to various embodiments of the invention in more detail, FIG. 1 is a functional block diagram of a network computing environment, generally designated 100, suitable for operation of a customized multicast program 101 and client program 102 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 100 includes client device 110 and multicast server 120 interconnected over network 130. Network 130 can be, for example, a telecommunications network, a local area network (LAN), a wide area network (WAN), such as the Internet, or a combination of the three, and can include wired, wireless, or fiber optic connections. Network 130 may include one or more wired and/or wireless networks that are capable of receiving and transmitting data, voice, and/or video signals, including multimedia signals that include voice, data, and video information. In general, network 130 may be any combination of connections and protocols that will support communications between client device 110, multicast server 120, and other computing devices (not shown) within network computing environment 100. In some embodiments, network 130 is any combination of connections and protocols that will support broadcasting between multicast server 120 and a plurality of client devices, such as client device 110. In other embodiments, network 130 is any combination of connections and protocols that will support multicasting between multicast server 120 and a plurality of client devices, such as client device 110. For example, network 130 exists within an IP network that supports UDP. In an embodiment, IGMP is added on top of UDP to further support receiving multicast messages by a client device, such as client device 110. In an embodiment, a reliable multicast protocol is added on top of UDP. The addition of a reliable multicast protocol on top of UDP provides loss detection and retransmission of lost datagrams. For example, Pragmatic General Multicast ("PGM") or Scalable Reliable Multicast ("SRM") is added on top of UDP.

Multicast server 120 includes customized multicast program 101, client registration database 160, and topic database 170. In various embodiments of the invention, multicast server 120 is a computing device that can be a standalone device, a management server, a web server, a mobile device, or any other electronic device or computing system capable of receiving, sending, and processing data. In other embodiments, multicast server 120 represents a server computing system utilizing multiple computers as a server system, such as in a cloud computing environment. In an embodiment, multicast server 120 represents a computing system utilizing clustered computers and components (e.g. database server computers, application server computers, etc.) that act as a single pool of seamless resources when accessed within network computing environment 100. In general, multicast server 120 represents any programmable electronic device or combination of programmable electronic devices capable of executing machine readable program instructions and communicating with a plurality of client devices, such as client device 110, within network computing environment 100 via a network, such as network 130.

Client device 110 allows a user to send and/or receive customized multicast messages. In general, client device 110 may be a laptop computer, tablet computer, netbook computer, personal computer (PC), a desktop computer, a personal digital assistant (PDA), a smart phone, or any programmable electronic device capable of receiving, sending, and processing data. In various embodiments of the invention, client device 110 has two operating modes: a client receiving mode and a client sending mode. In these embodiments, the client receiving mode and the client sending mode may be enabled and/or disabled. Accordingly, if the client receiving mode is disabled and the client sending mode is enabled, client device 110 may only send customized multicast messages. Similarly, if the client sending mode is disabled and the client receiving mode is enabled, client device 110 may only receive customized multicast messages. In other embodiments, a client device, such as client device 110, has only one operating mode: either a client receiving mode or a client sending mode.

Client device 110 includes client program 102, user interface 140, and client profile database 150. In some embodiments, client program 102 is mobile application software that provides a communication interface between client device 110 and customized multicast program 101 located on multicast server 120. In some embodiments, client program 102 is a client-based software application that runs on client device 110. In alternative embodiments, client program 102 is a web-based application that runs on a web browser. In any of these embodiments, client device 110 and multicast server 120 may execute commands and communicate with each other via any generally known network protocols via a network, such as network 130.

User interface 140 provides an interface between client device 110 and multicast server 120. In some embodiments, user interface 140 may be a graphical user interface (GUI) or a web user interface (WUI) and can display text, documents, web browser windows, user options, application interfaces, and instructions for operation, and includes the information (such a graphic, text, and sound) that a program presents to a user and the control sequences the user employs to control the program. In other embodiments, user interface 140 may also be mobile application software that provides an interface between customized multicasting program 101 and client program 102.

Multicast server 120 includes customized multicasting program 101, client registration database 160, and topic database 170 communicatively coupled to multicast server 120. Although customized multicasting program 101 and client registration database 160 are depicted in FIG. 1 as being integrated with multicast server 120, in alternative embodiments, customized multicasting program 101, client registration database 160, and topic database 170 are remotely located from multicast server 120. Client device 110 and multicast server 120 may include internal and external hardware components, as depicted and described in further detail with respect to FIG. 12.

Figure 2A:
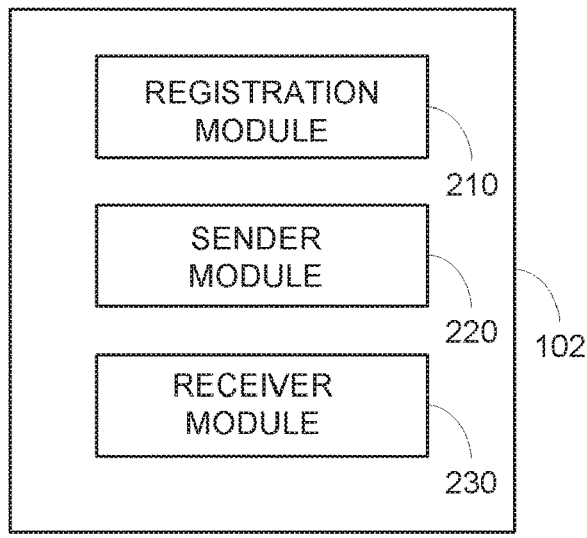
FIG. 2A is a functional block diagram depicting software components of client program 102, generally designated 200, in accordance with at least one embodiment of the invention.

FIG. 2A is a functional block diagram depicting software components of client program 102, generally designated 200A, in accordance with at least one embodiment of the invention. Client program 102 includes registration module 210, sender module 220, receiver module 230.

Registration module 210 registers a device, such as client device 110, for multicasting with multicast server 120. Registration module 210 generates a registration profile associated with client device 110. The registration profile includes a unique identifier (i.e., client ID) corresponding to client device 110. In some embodiments, the registration profile includes user information, such age, gender, home address, occupation, and employer. In some embodiments, the registration profile includes a first set of properties. The first set of properties are associated with contextual information with respect to client device 110. For example, the first set of properties may include location, geographical position, direction of movement, pathway, and receiving range of client device 110. It should be appreciated that the registration profile is customizable, such that the registration profile may include any number of properties associated with client device 110.

In embodiments of the invention, registration module 210 generates a subscription profile associated with a device, such as client device 110. The subscription profile includes a set of topics that indicate the types of information a user of client device 110 would like to receive from multicast server 120. In embodiments of the invention, client device 110 receives a list of topics from multicast server 120. Examples of topics may include, but are not limited to business information, stock information, traffic information and alerts, weather information, social networking information, social media information, dining and entertainment information, and sports information.

In some embodiments, each topic in the set of topics includes a second set of properties. The second set of properties are associated with conditions (i.e., restrictions) with respect to a topic of a multicast message. For example, the second set of properties may include a receiving range (e.g., a 20-mile radius with respect to a device's position), receiving period (e.g., time of day or day of the week), and severity level of information associated with the topic of a multicast message. In some embodiments, each topic in the set of topics does not include a second set of properties. In some embodiments, each topic in the set of topics includes a different set of properties. In some embodiments, each topic in the set of topics includes the same set of properties. It should be appreciated that subscription to topics in combination with a second set of properties ensures that a user of client device 110 only receives information that is relevant to the user at a given point in time.

In embodiments of the invention, registration module 210 re-registers (i.e., updates) and de-registers (i.e., removes) properties and topics. In some embodiments, properties are ad-hoc, such that the property values are fixed. In these embodiments, registration module 210 re-registers property values with multicast server 120 each time a property value changes. In some embodiments, property values are not fixed, such the property value changes intermittently. In these embodiments, registration module 210 re-registers property values when a property value falls outside of a given range of values. This helps to ensure that communications between client device 110 and multicast server 120 are minimized.

Sender module 220 sends messages to multicast server 120 for multicasting. In embodiments of the invention, each message includes a restriction bundle. A restriction bundle may generally be understood as a set of restrictions that allows the sender of a message to designate a dynamic group of intended recipients. For example, the set of restrictions includes a multicast range (i.e., a sending range with respect to a position of a sending device), a topic associated with the message, and a severity level of the information included in the message.

Receiving module 230 receives multicast messages and restriction bundles from multicast server 120. In embodiments of the invention, whether a client device receives a multicast message is based, at least in part, on the property values and topics registered with multicast server 120 at the time a request for multicasting of a message is received by multicast server 120. In embodiments of the invention, whether a client device loads the message is based, at least in part, on the current property values of the client device at the time the message is received. If a client device's current property values meet the criteria of the set of restrictions in the restriction bundle, receiving module 230 loads the message. On the other hand, if a client device's current property values do not meet the criteria of the set of restrictions in the restriction bundle, receiving module 230 discards the message.

Figure 2B:
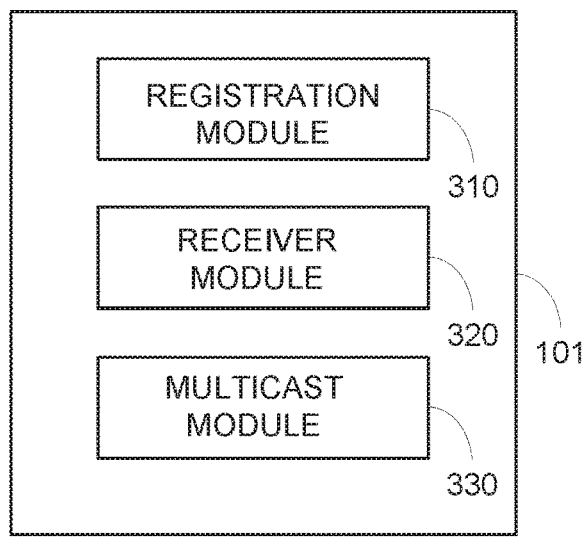
FIG. 2B is a functional block diagram depicting software components of customized multicast program 101, generally designated 300, in accordance with at least one embodiment of the invention.

FIG. 2B is a functional block diagram depicting software components of customized multicasting program 101, generally designated 200B, in accordance with at least one embodiment of the invention. Customized multicasting program 101 includes registration module 310, receiver module 320, and multicast module 330.

Registration module 310 receives the registration profile and subscription profile from client device 110 and stores these profiles under the corresponding client ID in client registration database 160. In embodiments of the invention, if the registration profile and/or subscription profile includes a property whose value changes intermittently (e.g., position of client device 110), registration module 310 sends re-registration instructions to client device 110. The re-registration instructions include a registered range for each property whose value changes intermittently. A registered range may generally be understood as a range of values that dictates when a client device re-registers a property. Accordingly, if a property value remains within the registered range, client device 110 need not re-register a change in the property value. However, if a property value of falls outside the registered range, client device 110 re-registers its current property value at the point or time at which the property value falls outside the registered range. In embodiments of the invention, registration module 310 sends a list of topics to client device 110. Registration module 310 stores and updates available topics for multicasting in topic database 170.

Receiver module 320 receives messages and associated restriction bundles from client devices, such as client device 110. Receiver module 320 generates a customized multicast distribution list of devices that will receive a multicast message. In embodiments of the invention, a client device is included in the distribution list for a given message if the information included in the registration profile and subscription profile of a client device meets the criteria of the restrictions included in the restriction bundle.

Multicast module 330 multicasts messages to registered client devices that meet the criteria of the restrictions included in the restriction bundle.

Figure 3A:
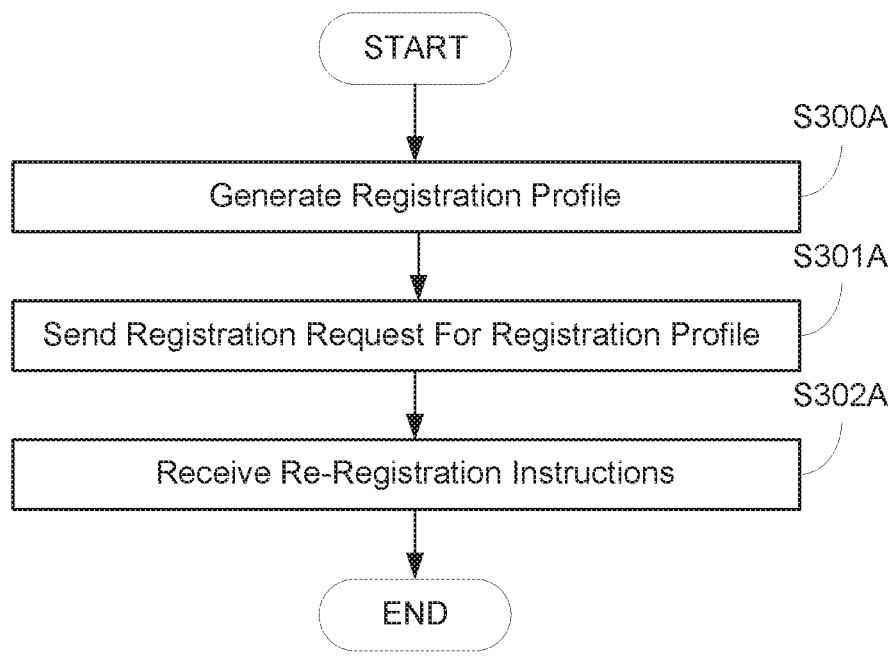
FIG. 3A is a flow chart diagram depicting operational steps for registering a client device by client program 102 in accordance with at least one embodiment of the invention.

FIG. 3A is a flow chart diagram depicting operational steps for registering a client device by client program 102 in accordance with at least one embodiment of the invention. At step S300A, client program 102 generates a registration profile. The registration profile includes a unique identifier corresponding to a client device, and a first set of properties for monitoring the client device. Client program 102 receives properties based on user input and/or selection of properties via user interface 140. Examples of properties for monitoring the status of a client device include, but are not limited to location, position, direction, pathway, receiving range, temperature, battery life, and fluid levels.

At step S301A, client device 110 sends a registration request to customized multicast program 101. The registration request includes the registration profile associated with client device 110. At step S302A, in response to sending the registration request, client program 102 receives re-registration instructions from customized multicast program 101. The re-registration instructions include a registered range for each registered property whose value changes intermittently.

Figure 3B:
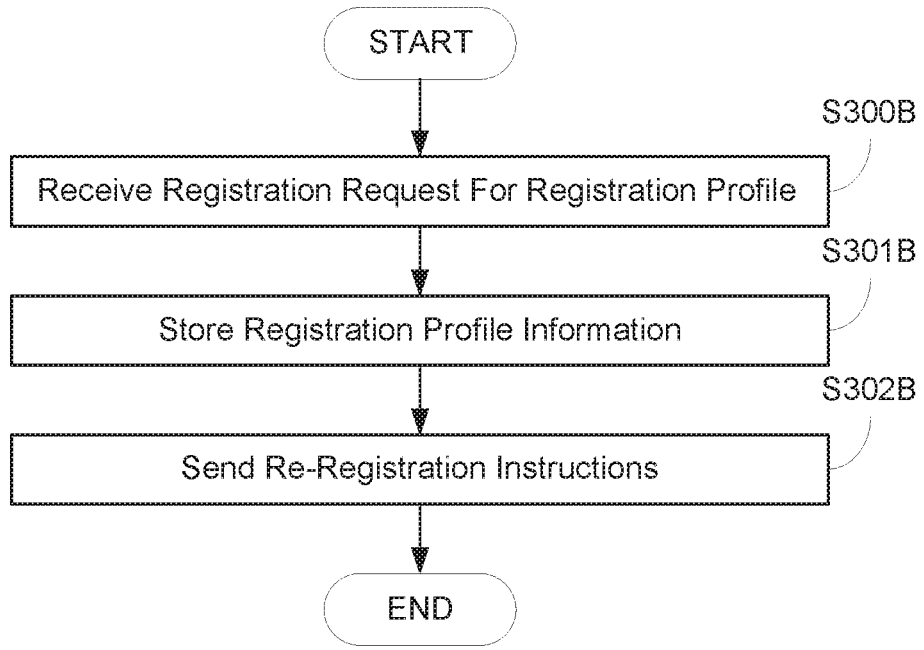
FIG. 3B is a flow chart diagram depicting operational steps for registering a client device by customized multicast program 101 in accordance with at least one embodiment of the invention.

FIG. 3B is a flow chart diagram depicting operational steps for registering a client device by customized multicast program 101 in accordance with at least one embodiment of the invention. At step S300B, customized multicast program 101 receives a registration request and associated registration profile from client device 110. At step S301B, customized multicast program 101 stores the registration profile in client registration database 160.

At step S302B, customized multicast program 101 sends re-registration instructions with one or more registered ranges to client device 110. Re-registration instructions are a means to trigger client program 102 to re-register properties if a current property value falls outside a given registered range. For example, client device 110 registers its current position (e.g., 56 N, 34E) with multicast server 120. In response to sending its current position, client device 110 receives a registered range (e.g., between 55N and 60N, and between 30E and 35E) based on its current position. In this example, if client device 110 remains within the registered range, client device 110 need not re-register its position. However, if client device 110 traverses outside the registered range, client device 110 automatically sends an updated position (i.e., re-registers its current position) to multicast server 120.

In some embodiments, customized multicast program 101 generates a registered range based on a client device's receiving range (i.e., a distance that a device will receive messages with respect to a location of a sending device). For example, the receiving range of client device 110 is a 3-mile radius. As the position of client device 110 changes, so too does the position of the receiving range. In this example, customized multicast program 101 generates a registered range with respect to the receiving range. Thus, if the boundary of the receiving range remains within the registered range, client device 110 need not re-register its position. However, if the boundary of the receiving range traverses outside the registered range, client device 110 automatically sends an updated position (i.e., re-registers its current position) to multicast server 120.

Figure 4A:
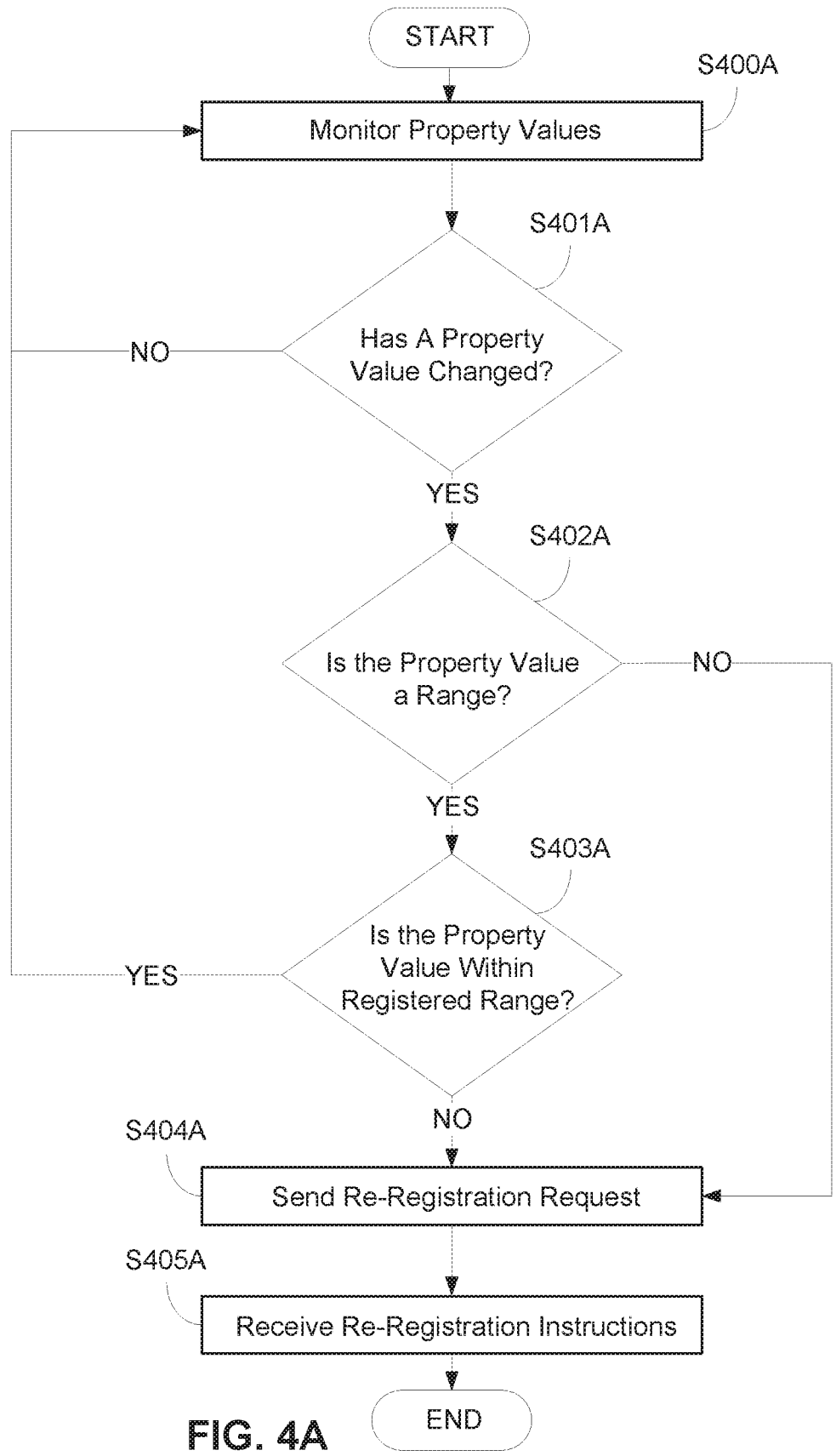
FIG. 4A is a flow chart diagram depicting operational steps for re-registering a property by client program 101 in accordance with at least on embodiment of the invention.

FIG. 4A is a flow chart diagram depicting operational steps for re-registering a property by client program 102 in accordance with at least on embodiment of the invention. At step S400A, client program 102 monitors the current (i.e., real-time) property values of each registered property. At decision step S401A, client program 102 determines whether a property value has changed. If client program 102 determines that a property value has changed, client program 102 proceeds to decision step S402A. If client program 102 determines that a property value has not changed, client program 102 returns to step S400A.

At decision step S402A, client program 102 determines whether the property includes a registered range. If client program 102 determines that the property does not include a registered range, client program 102 proceeds to step S404A. If client program 102 determines that the property does include a registered range, client program 102 proceeds to decision step S403A.

At decision step S403A, client program 102 determines whether a property value is within the registered range. If the property value is within the registered range, client program 102 returns to step S400A. If the property value is not within the registered range, client multicast program 102 proceeds to step S404A.

At step S404A, client program 102 sends a re-registration request to multicast server 120. The re-registration request includes the registration profile with the updated property value.

At step S405A, in response to sending the re-registration request, client program 102 receives re-registration instructions from customized multicast program 101. The re-registration instructions include a new registered range for the updated property value.

Figure 4B:
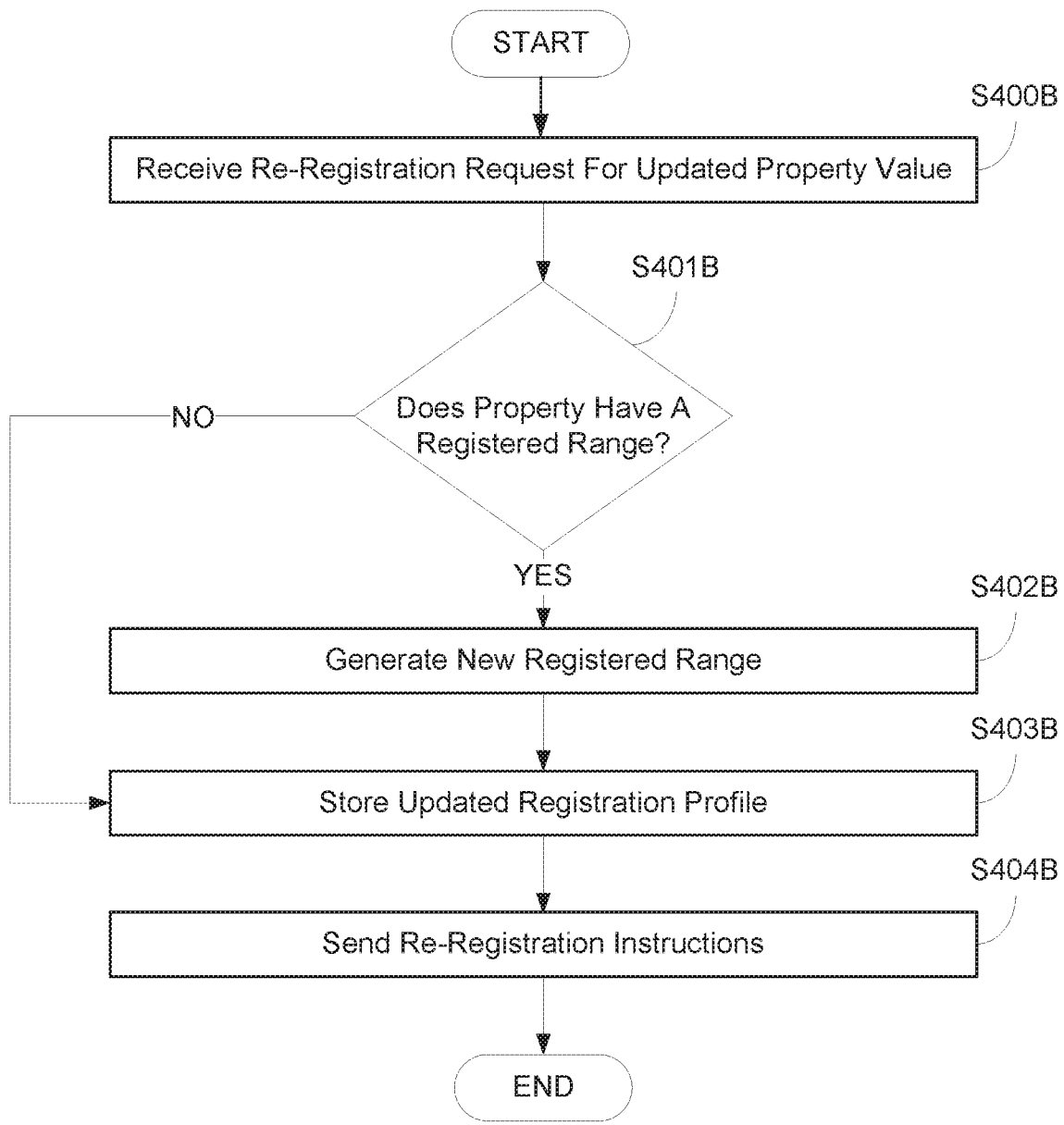
FIG. 4B is a flow chart diagram depicting operational steps for re-registering a property by customized multicast program 101 in accordance with at least on embodiment of the invention.

FIG. 4B is a flow chart diagram depicting operational steps for re-registering a property by customized multicast program 101 in accordance with at least on embodiment of the invention. At step S400B, customized multicast program 101 receives the re-registration request from client device 110. At decision step S401B, customized multicast program 101 determines whether the registration profile corresponding to the re-registration request includes a change in the value of a property with a registered range. If customized multicast program 101 determines that the property does not include a registered range, customized multicast program 101 proceeds to step S403B. If customized multicast program 101 determines that the property does include a registered range, customized multicast program 101 proceeds to step S402B.

At step S402B, customized multicast program 101 generates a new registered range for the updated property value. The new registered range is stored in client registration database 160. At step S403B, customized multicast program 101 stores the registration profile with the updated property value in client registration database 160. At step S404B, customized multicast program 101 sends re-registration instructions to client device 110. The re-registration instructions include the new registered range for the updated property value.

Figure 5A:
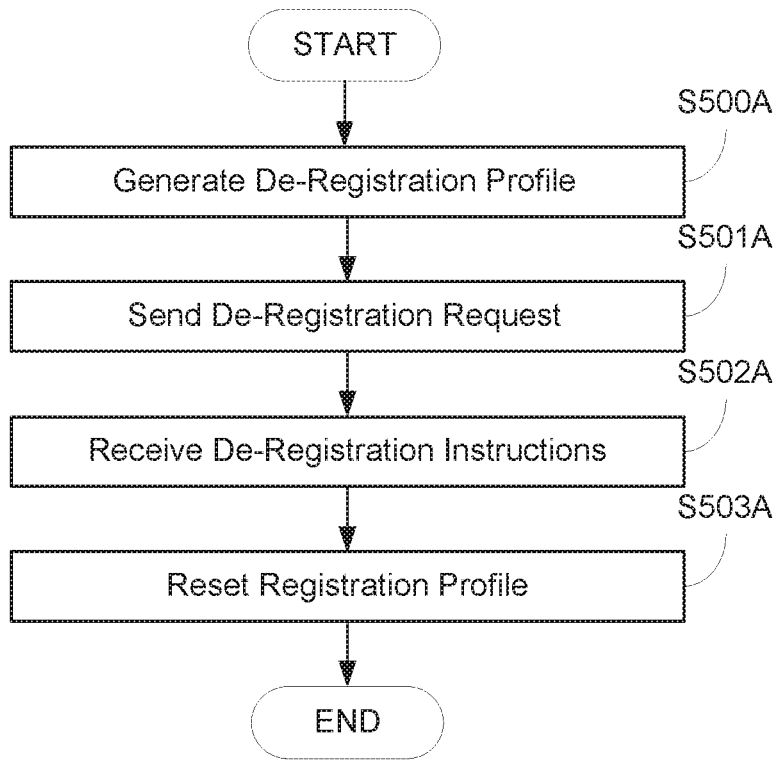
FIG. 5A is a flow chart diagram depicting operational steps for de-registering a property by client program 102 in accordance with at least one embodiment of the invention.

FIG. 5A is a flow chart diagram depicting operational steps for de-registering a property by client program 102 in accordance with at least one embodiment of the invention. In embodiments of the invention, de-registration may generally be understood as removing or deleting one or more properties from a registration profile. In some embodiments, de-registration includes removing a portion of the properties from a registration profile. In alternative embodiments, de-registration includes removing all properties from a registration profile. In these alternative embodiments, the removal of all properties from a registration profile will result in the deletion of the registration profile itself from client profile database 150. Accordingly, deletion of the registration profile will prevent client program 102 from monitoring the status of client device 110.

At step S500A, client program 102 generates a de-registration profile. A de-registration profile may generally be understood as a registration profile in which one or more properties have been designated to be removed from the registration profile. At step S501A, client device 110 sends a de-registration request to multicast server 120. The de-registration request includes the registration profile with properties designated for removal from client registration database 160.

At step S502A, in response to sending the de-registration request, client device 110 receives de-registration instructions. In some embodiments, the de-registration instructions include an acknowledgement that one or more properties have been removed from client registration database 160. In alternative embodiments, the de-registration instructions include an acknowledgment that the registration profile has been deleted from client registration database 160. At step S503A, in response to receiving the de-registration instructions, client program 102 resets the registration profile stored in client profile database 150.

Figure 5B:
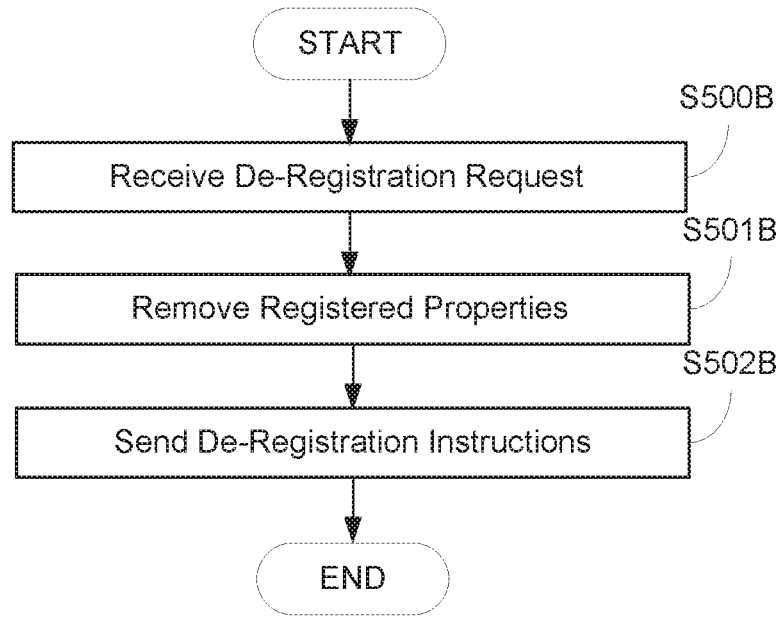
FIG. 5B is a flow chart diagram depicting operational steps for de-registering a property by customized multicast program 101 in accordance with at least one embodiment of the invention.

FIG. 5B is a flow chart diagram depicting operational steps for de-registering a property by customized multicast program 101 in accordance with at least one embodiment of the invention. At step S500B, customized multicast program 101 receives the de-registration request and registered profile with properties designated for removal from client device 110. At step S501B, customized multicast program 101 removes properties from client registration database 160 in accordance with those properties designated for removal. If all properties included in the registration profile are removed, customized multicast program 101 deletes the registration profile from client registration database 160. At step S502B, customized multicast program 101 sends de-registration instructions to client device 110.

Figure 6A:
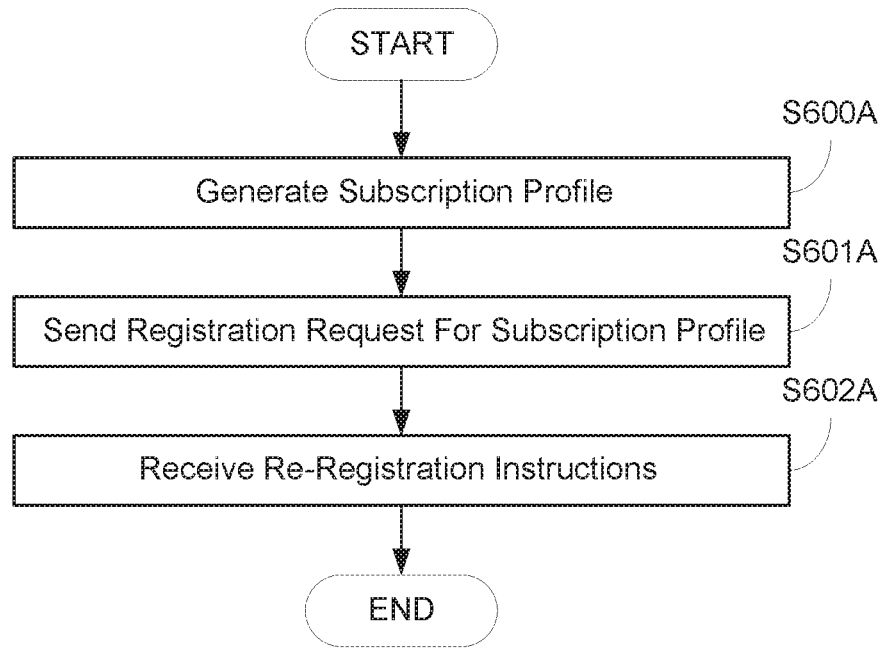
FIG. 6A is a flow chart diagram depicting operational steps for registering a topic by client program 102 in accordance with at least one embodiment of the invention.

FIG. 6A is a flow chart diagram depicting operational steps for registering a topic by client program 102 in accordance with at least one embodiment of the invention. At step S600A, client program 102 generates a subscription profile. The subscription profile includes a unique identifier corresponding to a client device, and a set of topics. A topic may generally be understood as a type of subject matter associated with a multicast message. Client program 102 receives topics based on user input and/or selection of topics via user interface 140. Examples of topics include, but are not limited to traffic information, such as delays, accidents, and detours, weather information, and sports and entertainment information. The registration of topics acts as a first filter, such that a user of a client device, such as client device 110, can restrict or limit the reception of multicast messages to a first set of customized information.

In some embodiments, each topic includes a second set of properties. Each property value for each property in the second set of properties acts as a second filter, such that a user of a client device, such as client device 110, can further restrict or limit the reception of multicast messages to a second set of customized information. It should be appreciated that registering properties for topics further refines the circumstances under which a user desires to receive multicast messages for a given topic. Client program 102 receives property values for each topic based on user input and/or selection of information via user interface 140. For example, if a user subscribes to the topic "traffic information," a user may register the following properties for the topic "traffic information:" (i) receiving range—10-mile radius; (ii) receiving time—7:00 am to 9:00 am, and (iii) severity level of information—emergency. According to the previously listed property values, a user of client device 110 desires to receive emergency messages regarding traffic information that are sent within a 10-mile radius of the user's current location between the hours of 7:00 am to 9:00 am. In alternative embodiments, generating a subscription profile does not include registering a second set of properties for each topic.

At step S601A, client device 110 sends a registration request to customized multicast program 101. The registration request includes the subscription profile associated with client device 110. At step S602A, in response to sending the registration request, client device 110 receives re-registration instructions from customized multicast program 101. The re-registration instructions include a registered range for each property in the second set of properties whose property value changes intermittently.

Figure 6B:
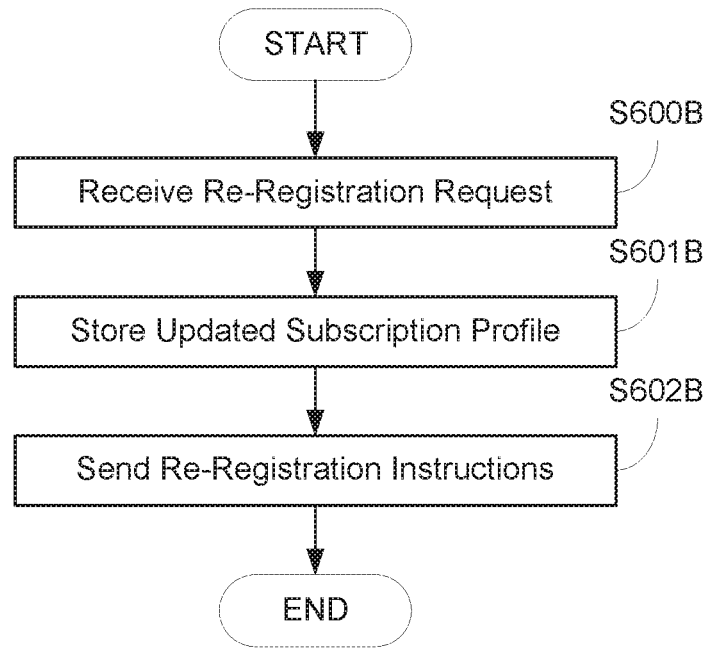
FIG. 6B is a flow chart diagram depicting operational steps for registering a topic by customized multicast program 101 in accordance with at least one embodiment of the invention.

FIG. 6B is a flow chart diagram depicting operational steps for registering a topic by customized multicast program 101 in accordance with at least one embodiment of the invention. At step S600B, customized multicast program 101 receives the registration request and associated subscription profile from client device 110. At step S601B, customized multicast program 101 stores the updated subscription profile in client registration database 160. At step S602B, customized multicast program 101 sends re-registration instructions to client device 110. The re-registration instructions include registration instructions for each property in the second set of properties whose property value changes intermittently. In embodiments of the invention, in response to sending re-registration instructions, customized multicast program 101 sends an updated list of multicast topics to client device 110.

Figure 7A:
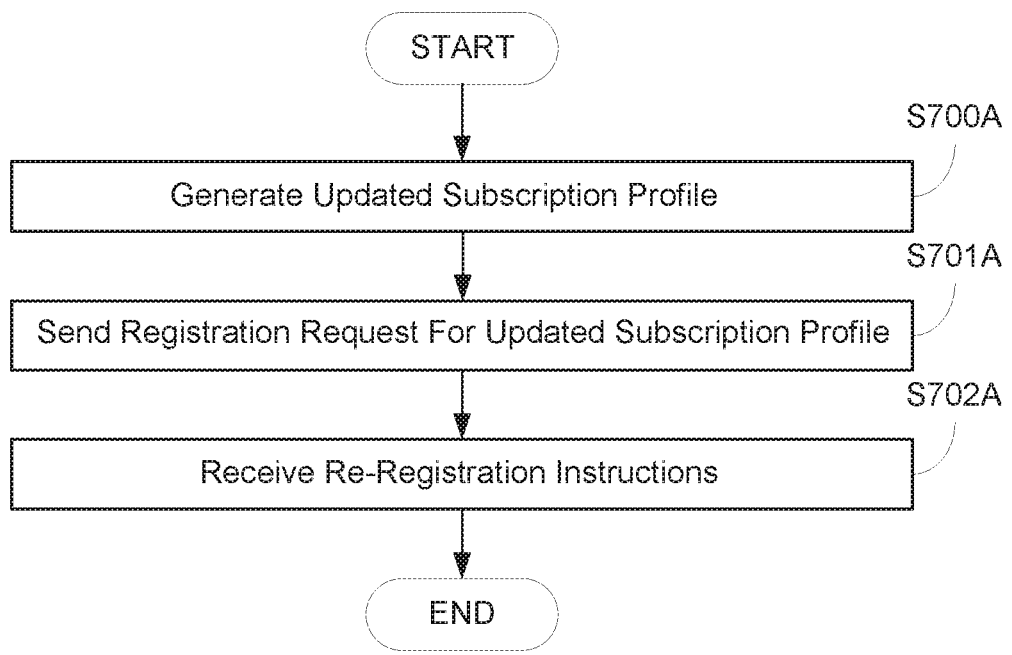
FIG. 7A is a flow chart diagram depicting operational steps for re-registering a topic by client program 102 in accordance with at least one embodiment of the invention.

FIG. 7A is a flow chart diagram depicting operational steps for re-registering a topic by client program 102 in accordance with at least one embodiment of the invention. At step S700A, client program 102 generates an updated subscription profile. In some embodiments, generating an updated subscription profile includes adding topics to the subscription profile. In some embodiments, generating an updated subscription profile includes adding one or more property values to a topic in the subscription profile. In some embodiments, generating an updated subscription profile includes modifying one or more property values associated with a topic in the subscription profile.

At step S701A, client device 110 sends a re-registration request to customized multicast program 101. The re-registration request includes the updated subscription profile. At step S702A, in response to sending the re-registration request, client device 110 receives re-registration instructions from customized multicast program 101. The re-registration instructions include a new registered range for those updated properties whose property value changes intermittently. In embodiments of the invention, in addition to receiving re-registration instructions, client device 110 receives an updated list of multicast topics from multicast server 120.

Figure 7B:
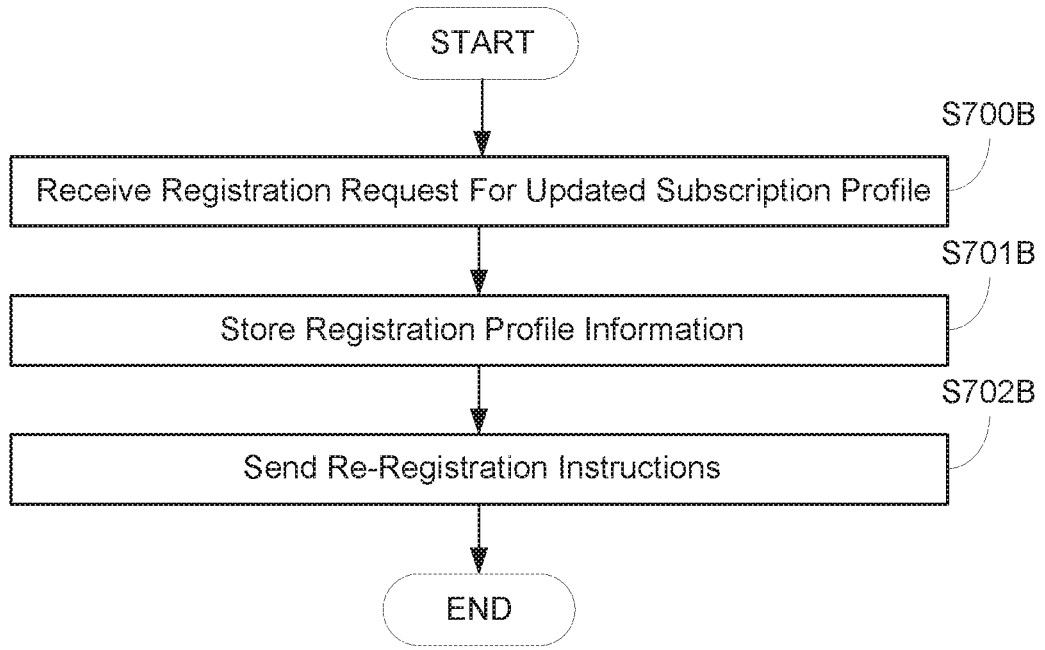
FIG. 7B is a flow chart diagram depicting operational steps for re-registering a topic by customized multicast program 101 in accordance with at least one embodiment of the invention.

FIG. 7B is a flow chart diagram depicting operational steps for re-registering a topic by customized multicast program 101 in accordance with at least one embodiment of the invention. At step S700B, customized multicast program 101 receives the re-registration request from client device 110. The re-registration request includes the updated subscription profile. In some embodiments, the updated subscription profile includes one or more updated topics. At step S701B, customized multicast program 101 stores the subscription profile with the updated topics and/or properties associated with a topic in client registration database 160. A step S702B, customized multicast program 101 sends re-registration instructions to client program 102. In embodiments of the invention, in response to receiving a re-registration request for a topic, customized multicast program 101 sends an updated list of multicast topics to client device 110.

In some embodiments, re-registering a topic includes updating the value of a property associated with a topic. In some embodiments, re-registering a topic includes registering a property with a topic. In these embodiments, if customized multicast program 101 determines either that (i) the updated property has a registered range, or (ii) the newly added property's value changes intermittently, customized multicast program 101 generates a new registered range for the property. The new registered range is stored in client registration database 160. In response to generating the new registered range, customized multicast program 101 sends re-registration instructions to client program 102. The re-registration instructions include the new registered range for updated and/or new property value associated with a topic.

Figure 8A:
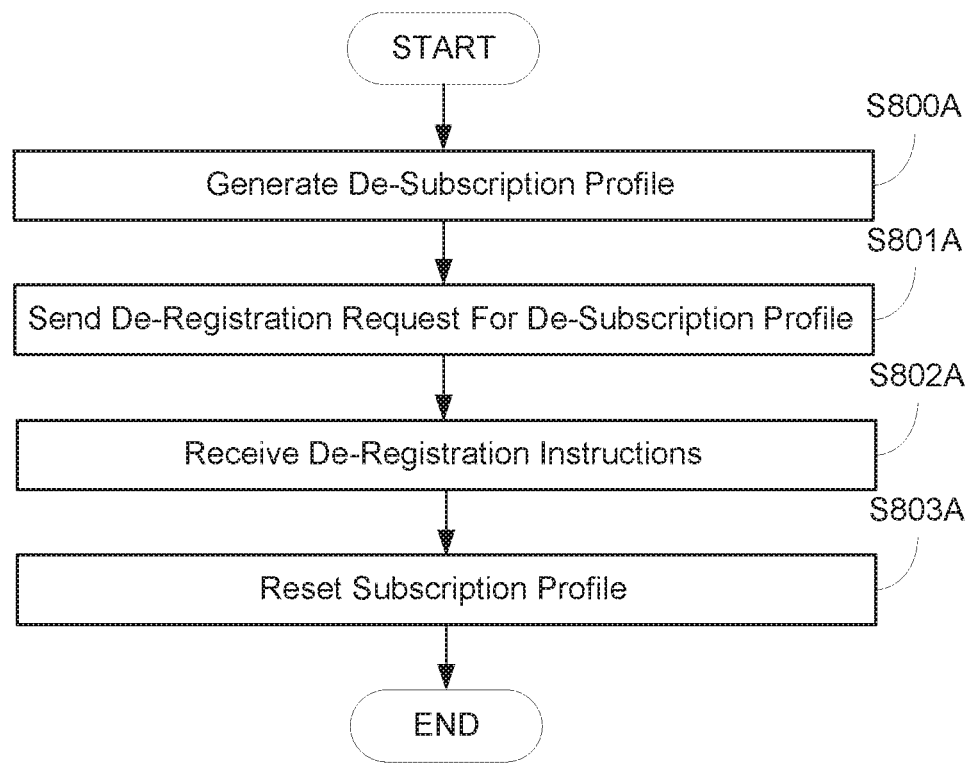
FIG. 8A is a flow chart diagram depicting operational steps for de-registering a topic by client program 102 in accordance with at least one embodiment of the invention.

FIG. 8A is a flow chart diagram depicting operational steps for de-registering a topic by client program 102 in accordance with at least one embodiment of the invention. In embodiments of the invention, de-registration of a topic may generally be understood as removing or deleting one or more topics included in a subscription profile stored in client registration database 160. In some embodiments, de-registration of a topic includes removing one or more properties associated with a topic. In some embodiments, de-registration of a topic includes removing all topics included in a subscription profile. In these embodiments, the removal of all topics from a subscription profile will result in the deletion of the subscription profile from client registration database 160.

At step S800A, client program 102 generates a de-subscription profile. A de-subscription profile may generally be understood as a subscription profile in which one or more topics and/or one or more properties associated with a topic have been designated to be removed from the subscription profile. At step S801A, client program 102 sends a de-registration request to customized multicast program 101. The de-registration request includes the de-subscription profile with one or more topics and/or properties that have been designated for removal from client registration database 160.

At step S802A, in response to sending the de-registration request, client program 102 receives de-registration instructions. In some embodiments, the de-registration instructions include an acknowledgement that one or more topics and/or properties have been removed from the subscription profile stored in client registration database 160. In alternative embodiments, the de-registration instructions include an acknowledgment that the subscription profile has been deleted from client database 160. At step S803A, in response to receiving the de-registration instructions, client program 102 resets the subscription profile stored in client profile database 150. In embodiments of the invention, in response to sending the de-registration request for a topic, client device 110 receives an updated list of multicast topics from multicast server 120.

Figure 8B:
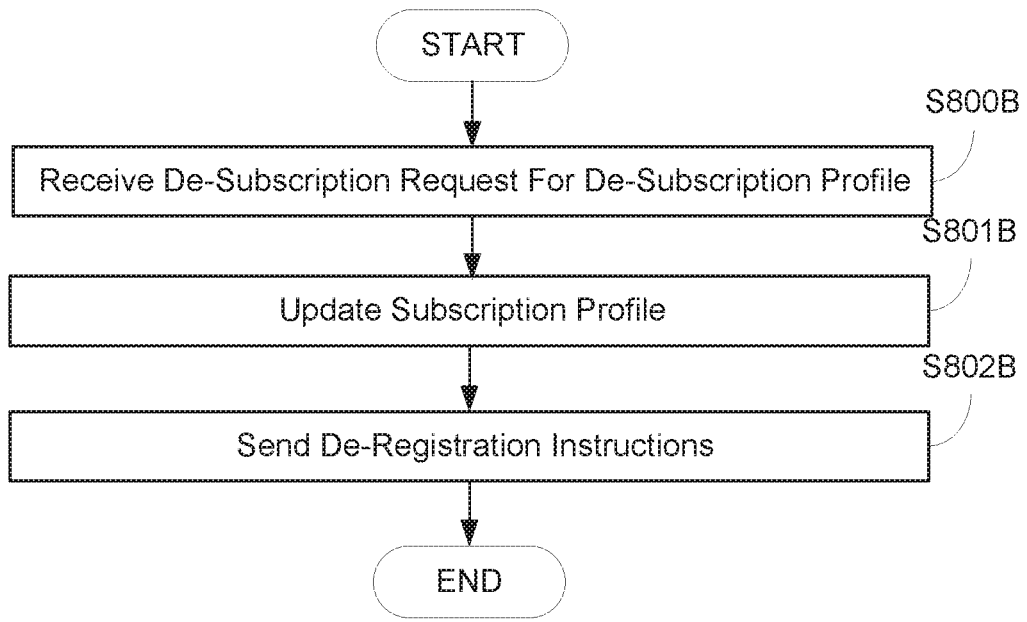
FIG. 8B is a flow chart diagram depicting operational steps for de-registering a topic by customized multicast program 101 in accordance with at least one embodiment of the invention.

FIG. 8B is a flow chart diagram depicting operational steps for de-registering a topic by customized multicast program 101 in accordance with at least one embodiment of the invention. At step S800B, customized multicast program 101 receives the de-registration request and de-subscription profile from client device 110. At step S801B, customized multicast program 101 removes topics and/or properties associated with topics from the subscription profile stored in client registration database 160 in accordance with those topics and/or properties designated for removal. If all topics included in the subscription profile are removed, customized multicast program 101 deletes the subscription profile from client registration database 160. At step S802B, customized multicast program 101 sends de-registration instructions to client device 110.

Figure 9:
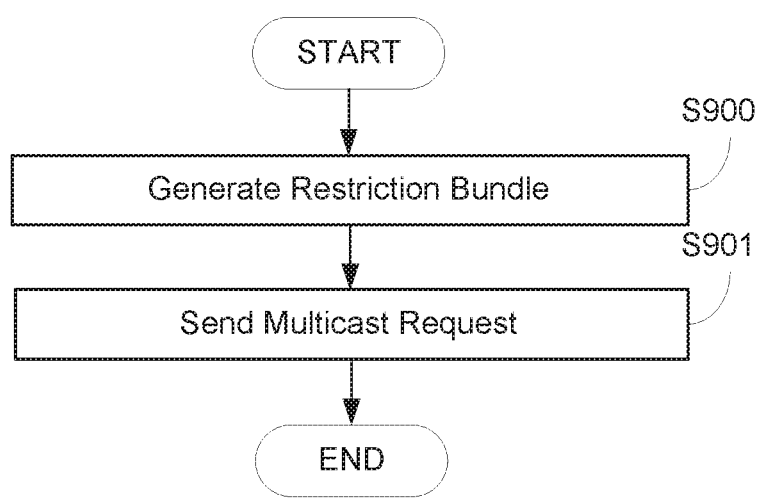
FIG. 9 is a flow chart diagram depicting operational steps for requesting multicasting of a message by client program 102 in accordance with at least one embodiment of the invention.

FIG. 9 is a flow chart diagram depicting operational steps for requesting multicasting of a message by client program 102 in accordance with at least one embodiment of the invention. At step S900A, client program 102 generates a restriction bundle. A restriction bundle may generally be understood as a set of restrictions that defines a dynamic group of intended recipients of a multicast message. In embodiments of the invention, the restriction bundle includes a multicast range with respect to the position of a sending device, whereby a user can restrict multicasting of the message to recipients that have a receiving range that overlaps with the multicast range.

In some embodiments, the restriction bundle includes a topic, whereby a user can restrict multicasting of the message to recipients who registered the topic. In an embodiment, the topic of a message is determined based on user input and/or selection of a topic from a list of topics via user interface 140. In an alternative embodiment, client program 102 and or customized multicast program 101 determines the topic of a message through the use of text mining software to extract keywords from the message. Text mining (i.e., text data mining, text analytics) is the process of deriving high-quality information from text. Within the field of text mining, keyword extraction is the automatic identification of terms that best describe or characterize the subject of a textual data. In some embodiments, the restriction bundle includes a severity level of the information included in the message, whereby a user can restrict multicasting of the message to recipients based on their registered severity level. It should be appreciated that the restriction bundle may include any number of restrictions to further refine the intended recipients of a multicast message.

At step S901A, client device 110 sends a multicast request to multicast server 120. The multicast request includes a message to be multicasted and the validity bundle associated with the message.

Figure 10:
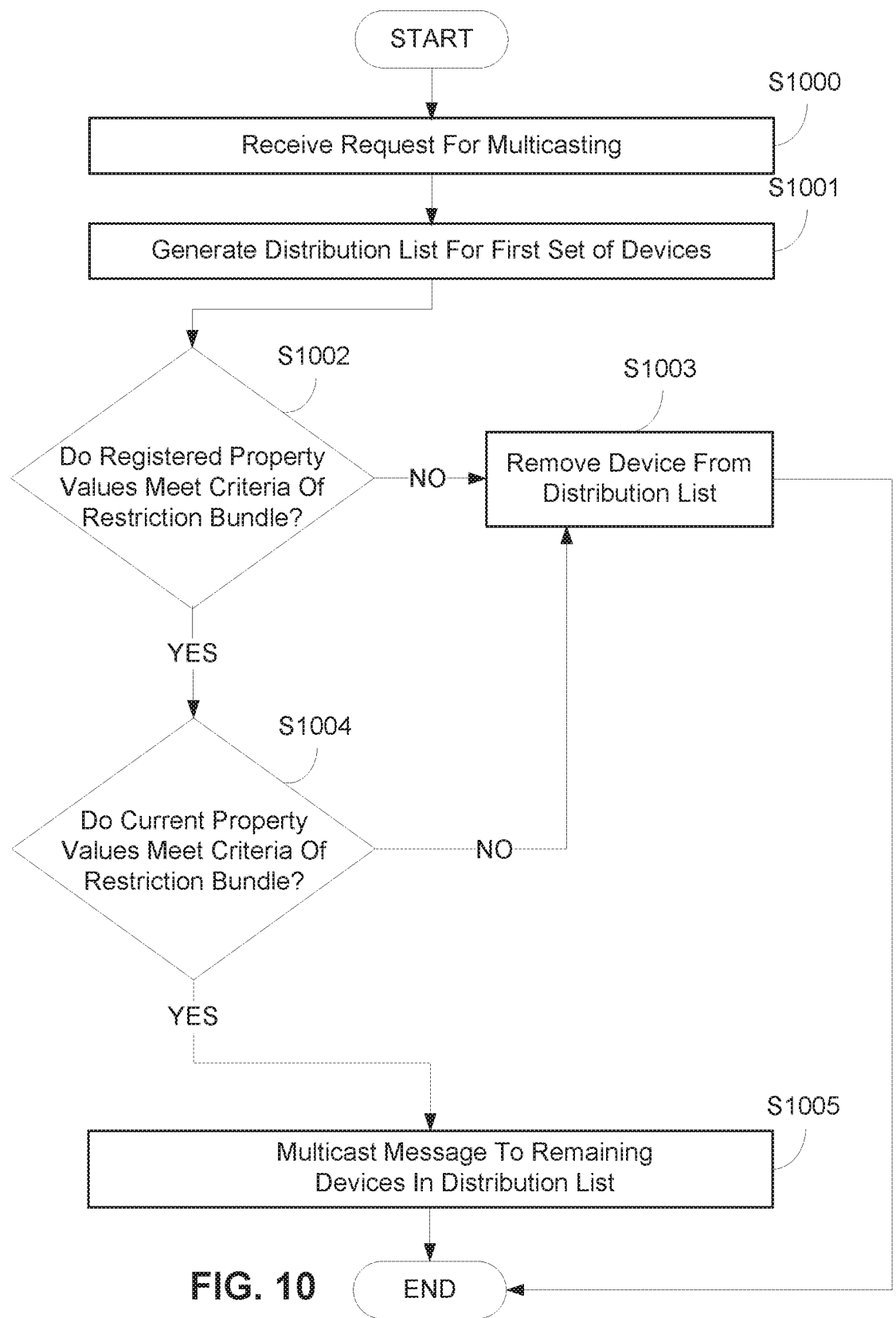
FIG. 10 is a flow chart diagram depicting operational steps for multicasting a message by customized multicast program 101 in accordance with at least one embodiment of the invention.

FIG. 10 is a flow chart diagram depicting operational steps for multicasting a message in accordance with at least one embodiment of the invention. At step S1000, customized multicast program 101 receives the multicast request from a client device, such as client device 110. The multicast request includes the message and the restriction bundle associated with the message.

At step S1001, customized multicast program 101 dynamically generates a distribution list for a first set of registered client devices based, at least in part, on an overlap between the registered range of a registered client device and the multicast range included in the restriction bundle. Here, the registered range of a client device is based on the registered position of the client device. Similarly, the multicast range in the restriction bundle is based on the registered position of the sending device.

At decision step S1002, customized multicast program 101 determines whether the registered information (i.e., registered property values) of each client device in the distribution list meets the criteria of (i.e., complies with, conforms to) each restriction in the restriction bundle. For example, if the restriction bundle includes the topic "sports," then a client device meets the criteria for "sports" if the device registered the topic sports with multicast server 120. In another example, if the restriction bundle includes the severity level—"emergency," then a client device meets the criteria for "emergency" if the device registered "severity level—all" or "severity level—no restrictions." If the registered information does not meet the criteria of each restriction in the restriction bundle, customized multicast program 101 proceeds to step S1003. If the registered information does meet the criteria of each restriction in the restriction bundle, customized multicast program proceeds to decision step S1003.

At step S1003, customized multicast program 101 removes the client device from the distribution list. Accordingly, the client device will not receive the multicast message from customized multicast program 101.

At decision step S1004, customized multicast program 101 determines whether the current (i.e., real-time) property values of each remaining client device in the distribution list meets the criteria of each restriction in the restriction bundle. Since intermittent property values need only be re-registered if the values fall outside a given range, a device's registered property values and its current property values at the time a request for multicasting a message is received may no longer meet the criteria of each restriction in the restriction bundle. For example, based on a registered position of a device, customized multicast program 101 determines that the receiving range with respect to the registered position of the device overlaps with the multicast range in the restriction bundle. However, based on the current position of the device, client program 102 determines that the receiving range with respect to the current position of the device does not intersect or overlap the multicast range.

In order to determine the current property values, customized multicast program 101 sends re-registration instructions to each remaining client device in the distribution list whose registered property values meet the criteria of each restriction in the restriction bundle. Here, the re-registration instructions include instructions for client program 102 to send (i.e., re-register) the current property values of a client device to customized multicast program 101.

It should be understood that in embodiments of the invention, re-registration instructions are a means to trigger client program 102 to re-register properties if a current property value falls outside a given registered range. However, in some embodiments, re-registration instructions may also be a means to trigger client program 102 to re-register its current property values, irrespective of whether or not a current property value falls outside a given registered range. In these embodiments, customized multicast program 101 sends re-registration instructions that include instructions for a client device to re-register its current property values. Here, customized multicast program 101 sends re-registration instructions including instructions to re-register a device's current property values to those client devices in the distribution list whose registered property values meet the criteria of each restriction in the restriction bundle.

If customized multicast program 101 determines that the current property values do not meet the criteria of each restriction in the restriction bundle, customized multicast program 101 removes the client device from the distribution list. If customized multicast program 101 determines that the current property values do meet the criteria of each restriction in the restriction bundle, the client device remains in the distribution list. In alternative embodiments, customized multicast program 101 does not perform decision step S1003. In these embodiments, client program 102 determines whether a client device's current property values meet the criteria of each restriction in the restriction bundle.

At step S1004, customized multicast program 101 multicasts the message to the remaining client devices in the distribution list. In response to receiving the message, a client device, such as client device 110, loads the message.

In alternative embodiments, at step S1004, if customized multicast program 101 does not perform step S1003, customized multicast program 101 multicasts the message and the restriction bundle to each client device in the distribution list whose registered property values meet each restriction in the restriction bundle. In response to receiving the multicast message and restriction bundle, client program 102 processes the multicast message in accordance with the steps outlined in FIG. 11 below.

Figure 11:
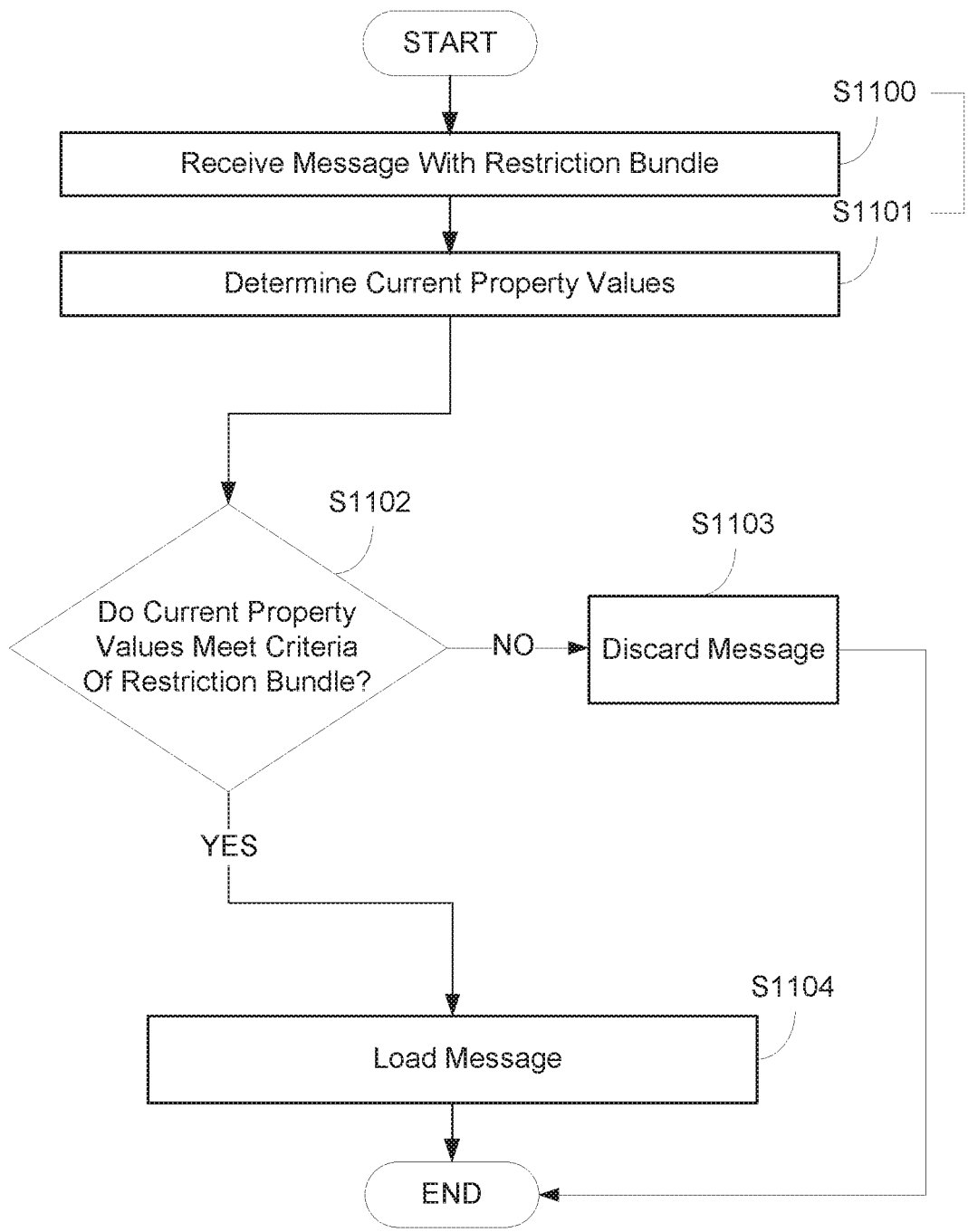
FIG. 11 is a flow chart diagram depicting operational steps for processing a message by client program 102 in accordance with at least one embodiment of the invention.

FIG. 11 is a flow chart diagram depicting operational steps for processing a multicast message by client program 102 in accordance with at least one embodiment of the invention. At step S1100, client program 102 receives the multicast message and the restriction bundle. At step S1101, client program 102 determines its current property values at the time the message and restriction bundle are received. At decision step S1102, client program 102 determines whether the current property values associated with client device 110 meet the criteria of each restriction in the restriction bundle. If client program 102 determines that the current property values do not meet the criteria of each restriction in the restriction bundle, client program 102 proceeds to step S1103. If client program 102 determines that the current property values do meet the criteria of each restriction in the restriction bundle, client program 102 proceeds to step S1104.

At step S1103, client device deletes the message and the process ends. In embodiments of the message, deleting the message may generally be understood as rejecting the message. More particularly, deleting the message includes preventing the message from being presented to a user of client device, such as client device 110.

At step S1104, client program 102 loads the message. In embodiments of the invention, loading the message may generally be understood as accepting the message. More particularly, loading the message includes making the message available or presenting the message to a user of a client device, such as client device 110.

Figure 12:
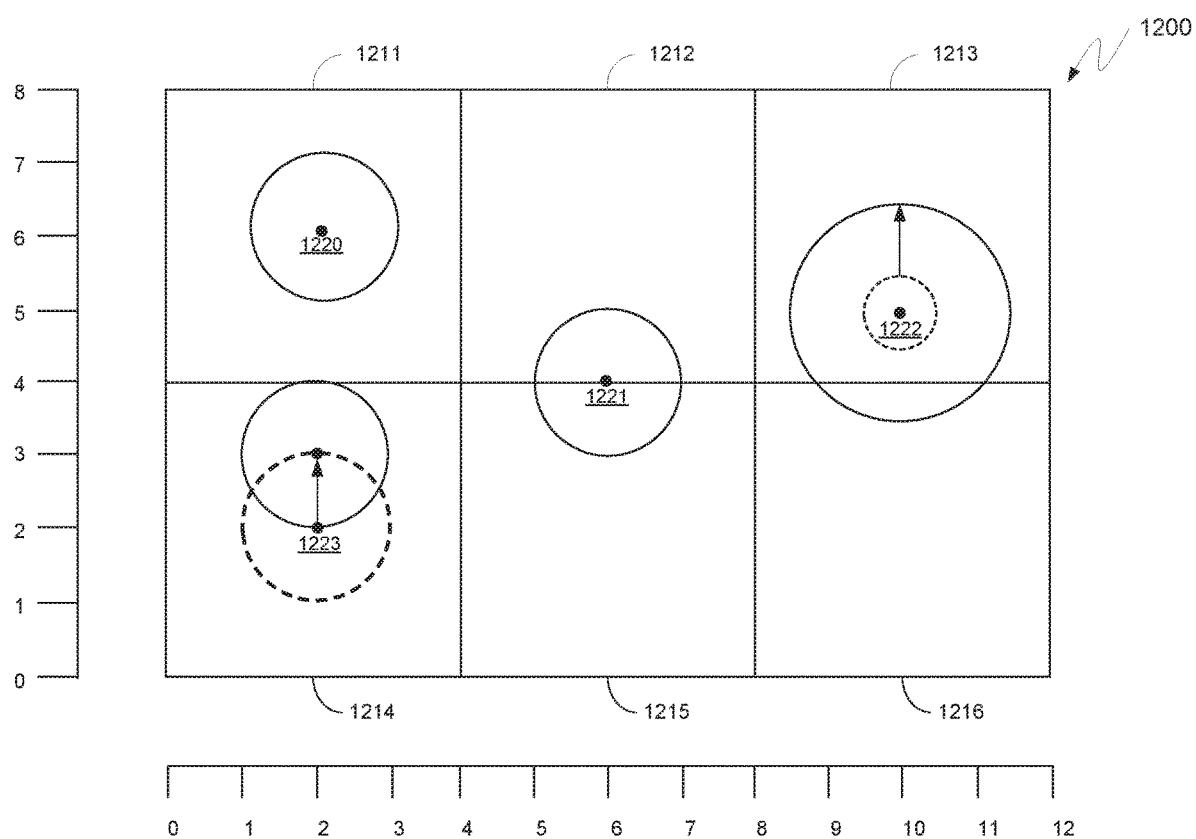
FIG. 12 is a worked example of re-registering a property by client program 102 in accordance with at least one embodiment of the present invention.

FIG. 12 is a worked example of re-registration of a property in accordance with at least one embodiment of the present invention. In the depicted embodiment, map, generally designated 1200, includes quadrants 1211-1216, wherein each quadrant is 4-units by 4-units in size. Map 1200 further includes client devices 1220-1223, with registered positions of (2, 6), (6, 4), (10, 5), and (2, 2), respectively. Each of client devices 1220-1223 includes a receiving range for messages. A receiving range is a radial distance by which a receiving device desires to receive messages sent from a sending device. The radial distance stems from a central point (i.e., a client devices registered position). As depicted in FIG. 12, client devices 1220-1223 have receiving ranges with radial distances of (1.0 unit), (0.5 units), (1.0 unit), and (1.0 unit), respectively, from their registered position.

Based on each client device's receiving range with respect to their registered position, each client device receives a registered range. In this example, the registered range is determined based, at least in part, on the quadrants in which a device's receiving range occupies. Since the receiving range of client device 1220 falls entirely within quadrant 1, client device 1220 receives a registered range of (0 . . . 4), (4 . . . 8). Similarly, since the receiving range of client device 1122 falls within quadrant 2 and quadrant 5, client device 1222 receives a registered range of (4 . . . 8), (0 . . . 8). As long as the receiving range with respect to the current position of a client device remains within the registered range, the client device need not re-register its current position.

However, if the receiving range with respect to the current position of a client device extends beyond the registered range, the client device re-registers its current position. In an embodiment, a client device re-registers its position if the position of the client device changes, such that the receiving range with respect to the device's new position extends beyond the registered range. For example, in the depicted embodiment, client device 1223 has moved from an initial position (2, 2) to its current position (2, 3). At this point, the receiving range extends beyond the registered range of (0 . . . 4), (0 . . . 4). Accordingly, client device 1222 re-registers its position (2, 3) at the point in time in which its receiving range extended beyond the registered range. In response to re-registering its current position (2, 3), client device 1223 receives a new registered range of (0 . . . 4), (0 . . . 8).

In an embodiment, a client device re-registers its position if the receiving range of the client device changes, such that an increase in the receiving range with respect to a devices current position extends beyond the registered range. For example, in the depicted embodiment, client device 1222 has increased its receiving range from a radius of 0.5 units with respect to the devices current position to a radius of 1.5 units. At this point, the receiving range extends beyond the registered range of (8 . . . 12), (4 . . . 12). In response to client device 1222 re-registering its new receiving range of 1.5 units, client device 1222 receives a new registered range of (8 . . . 12), (0 . . . 8).

Figure 13:
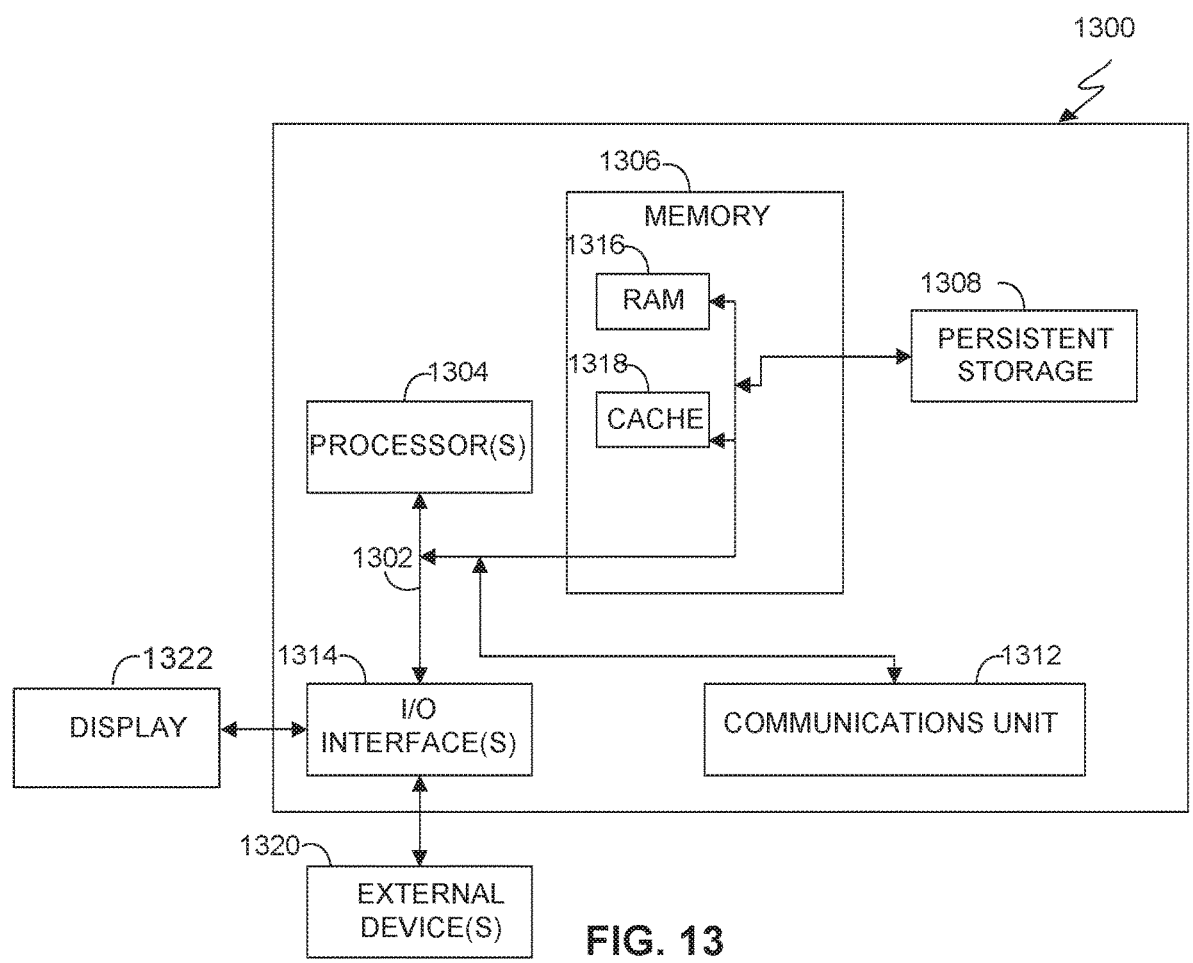
FIG. 13 is a block diagram depicting components of a computer, generally designated 1300, suitable for executing customized multicast program 101 and client program 102 in accordance with at least one embodiment of the invention.

FIG. 13 is a block diagram depicting components of a computer 1300 suitable for executing customized multicast program 101 and client program 102 in accordance with at least one embodiment of the invention. In an embodiment, computer 1300 is representative of client device 110 and multicast server 120. FIG. 13 displays the computer 1300, one or more processor(s) 1304 (including one or more computer processors), a communications fabric 1302, a memory 1306 including, a RAM 1316, and a cache 1318, a persistent storage 1308, a communications unit 1312, I/O interfaces 1314, a display 1322, and external devices 1320. It should be appreciated that FIG. 13 provides only an illustration of one embodiment and does not imply any limitations with regard to the environments in which different embodiments may be implemented. Many modifications to the depicted environment may be made.

As depicted, the computer 1300 operates over the communications fabric 1302, which provides communications between the computer processor(s) 1304, memory 1306, persistent storage 1308, communications unit 1312, and input/output (I/O) interface(s) 1314. The communications fabric 1302 may be implemented with any architecture suitable for passing data or control information between the processors 1304 (e.g., microprocessors, communications processors, and network processors), the memory 1306, the external devices 1320, and any other hardware components within a system. For example, the communications fabric 1302 may be implemented with one or more buses.

The memory 1306 and persistent storage 1308 are computer readable storage media. In the depicted embodiment, the memory 1306 comprises a random access memory (RAM) 1316 and a cache 1318. In general, the memory 1306 may comprise any suitable volatile or non-volatile one or more computer readable storage media.

Program instructions for customized multicast program 101 and client program 102 may be stored in the persistent storage 1308, or more generally, any computer readable storage media, for execution by one or more of the respective computer processors 1304 via one or more memories of the memory 1306. The persistent storage 1308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 1308 may also be removable. For example, a removable hard drive may be used for persistent storage 1308. Other examples include optical and magnetic disks, thumb drives, and smart cards that are inserted into a drive for transfer onto another computer readable storage medium that is also part of the persistent storage 1308.

The communications unit 1312, in these examples, provides for communications with other data processing systems or devices. In these examples, the communications unit 1312 may comprise one or more network interface cards. The communications unit 1312 may provide communications through the use of either or both physical and wireless communications links. In the context of some embodiments of the present invention, the source of the various input data may be physically remote to the computer 1300 such that the input data may be received, and the output similarly transmitted via the communications unit 1312.

The I/O interface(s) 1314 allow for input and output of data with other devices that may operate in conjunction with the computer 1300. For example, the I/O interface 1314 may provide a connection to the external devices 1320, which may be as a keyboard, keypad, a touch screen, or other suitable input devices. External devices 1320 may also include portable computer readable storage media, for example thumb drives, portable optical or magnetic disks, and memory cards. Software and data used to practice embodiments of the present invention may be stored on such portable computer readable storage media and may be loaded onto the persistent storage 1308 via the I/O interface(s) 1314. The I/O interface(s) 1314 may similarly connect to a display 1322. The display 1322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a mobile device, a multicast message that includes a message and a restriction bundle, wherein the restriction bundle includes a set of restrictions that defines a dynamic group of intended recipients of the multicast message;
determining, by the mobile device, that a set of current device property values associated with the mobile device at a time the multicast message is received by the mobile device meets the criteria of each restriction in the restriction bundle; and
loading, by the mobile device, the message in response to determining that the current set of device property values associated with the mobile device at the time the multicast message is received by the mobile device meets the criteria of each restriction in the restriction bundle.

2. The computer-implemented method of claim 1, wherein receiving, by the mobile device, the multicast message is based, at least in part, on:
an overlap between a current receiving range of the mobile device and a multicast range included in the restriction bundle.

3. The computer-implemented method of claim 1, wherein receiving, by mobile device, the multicast message is further based, at least in part, on:
a set of registered device property values associated with the mobile device at the time the multicast message is transmitted meeting the criteria of each restriction in the restriction bundle.

4. The computer-implemented method of claim 1, further comprising:
registering, by the mobile device, a set of device property values associated with the mobile device with a multicast server; and
re-registering, by the mobile device, a device property value in the set of device property values if a current device property value falls outside of a predetermined range associated with a registered device property value.

5. The computer-implemented method of claim 4, wherein the set of device property values registered with the multicast server includes at least one property value selected from the group consisting of: (i) location, (ii) geographical position, (iii) direction of movement, (iv) pathway, and (v) receiving range.

6. The computer-implemented method of claim 1, wherein receiving, by the mobile device, the multicast message is further based, at least in part, on a message topic associated with the mobile device and registered with a multicast server meeting the criteria of a message topic included in the restriction bundle.

7. The computer-implemented method of claim 6, wherein receiving, by the mobile device, the multicast message is further based, at least in part, on a current set of conditions associated with the mobile device at a time the multicast message is transmitted meeting a registered set of conditions associated with the message topic.

8. A computer program product, the computer program product comprising one or more computer readable storage media and program instructions stored on the one or more computer readable storage media, the program instructions comprising instructions to:
receive, by a mobile device, a multicast message that includes a message and a restriction bundle, wherein the restriction bundle includes a set of restrictions that defines a dynamic group of intended recipients of the multicast message;

determine, by the mobile device, that a set of current device property values associated with the mobile device at a time the multicast message is received by the mobile device meets the criteria of each restriction in the restriction bundle; and load, by the mobile device, the message in response to determining that the current set of device property values associated with the mobile device at the time the multicast message is received by the mobile device meets the criteria of each restriction in the restriction bundle.

9. The computer program product of claim 8, wherein receiving, by the mobile device, the multicast message is based, at least in part, on:

an overlap between a current receiving range of the mobile device and a multicast range included in the restriction bundle.

10. The computer program product of claim 8, wherein the program instructions to receive, by the mobile device, the multicast message is further based, at least in part, on:

a set of registered device property values associated with the mobile device at the time the multicast message is transmitted meeting the criteria of each restriction in the restriction bundle.

11. The computer program product of claim 8, further comprising program instructions to:

register, by the mobile device, a set of device property values associated with the mobile device with a multicast server; and re-register, by the mobile device, a device property value in the set of device property values if a current device property value falls outside of a predetermined range associated with a registered device property value.

12. The computer program product of claim 11, wherein the set of device property values registered with the multicast server includes at least one property value selected from the group consisting of: (i) location, (ii) geographical position, (iii) direction of movement, (iv) pathway, and (v) receiving range.

13. The computer program product of claim 8, wherein the program instructions to receive, by the mobile device, the multicast message is further based, at least in part, on a message topic associated with the mobile device and registered with a multicast server meeting the criteria of a message topic included in the restriction bundle.

14. The computer program product of claim 13, wherein the program instructions to receive, by the mobile device, the multicast message is further based, at least in part, on a current set of conditions associated with the mobile device at a time the multicast message is transmitted meeting a registered set of conditions associated with the message topic.

15. A computer system comprising:
one or more computer processors;
one or more computer readable storage media;
computer program instructions;
the computer program instructions being stored on the one or more computer readable storage media for execution by the one or more computer processors; and
the computer program instructions comprising instructions to:

receive, by a mobile device, a multicast message that includes a message and a restriction bundle, wherein the restriction bundle includes a set of restrictions that defines a dynamic group of intended recipients of the multicast message;

determine, by the mobile device, that a set of current device property values associated with the mobile device at a time the multicast message is received by the mobile device meets the criteria of each restriction in the restriction bundle; and load, by the mobile device, the message in response to determining that the current set of device property values associated with the mobile device at the time the multicast message is received by the mobile device meets the criteria of each restriction in the restriction bundle.

16. The computer system of claim 15, wherein receiving, by the mobile device, the multicast message is based, at least in part, on:

an overlap between a current receiving range of the mobile device and a multicast range included in the restriction bundle.

17. The computer system of claim 15, wherein the program instructions to receive, by the mobile device, the multicast message is further based, at least in part, on:

a set of registered device property values associated with the mobile device at the time the multicast message is transmitted meeting the criteria of each restriction in the restriction bundle.

18. The computer system of claim 15, further comprising program instructions to:

register, by the mobile device, a set of device property values associated with the mobile device with a multicast server; and re-register, by the mobile device, a device property value in the set of device property values if a current device property value falls outside of a predetermined range associated with a registered device property value.

19. The computer system of claim 15, wherein the program instructions to receive, by the mobile device, the multicast message is further based, at least in part, on a message topic associated with the mobile device and registered with a multicast server meeting the criteria of a message topic included in the restriction bundle.

20. The computer system of claim 19, wherein the program instructions to receive, by the mobile device, the multicast message is further based, at least in part, on a current set of conditions associated with the mobile device at a time the multicast message is transmitted meeting a registered set of conditions associated with the message topic.

* * * * *